United States Patent
Lee et al.

(10) Patent No.: US 9,947,196 B2
(45) Date of Patent: Apr. 17, 2018

(54) WIRELESS ASSET TRACKING SYSTEMS WITH HETEROGENEOUS COMMUNICATION

(71) Applicant: Senaya, Inc., Framingham, MA (US)

(72) Inventors: Brian Lee, Boston, MA (US); Jahangir Nakra, Titusville, NJ (US); Dadi Setiadi, Edina, MN (US); Jamshed Dubash, Shrewsbury, MA (US)

(73) Assignee: Senaya, Inc., Framingham, MA (US)

( * ) Notice: Subject to any disclaimer, the term of this patent is extended or adjusted under 35 U.S.C. 154(b) by 0 days.

(21) Appl. No.: 15/140,753

(22) Filed: Apr. 28, 2016

(65) Prior Publication Data

US 2016/0321897 A1    Nov. 3, 2016

Related U.S. Application Data

(60) Provisional application No. 62/154,236, filed on Apr. 29, 2015.

(51) Int. Cl.
*H04W 4/00* (2009.01)
*G08B 13/24* (2006.01)
*H04W 4/02* (2018.01)

(52) U.S. Cl.
CPC ..... *G08B 13/2462* (2013.01); *G08B 13/2417* (2013.01); *H04W 4/008* (2013.01); *H04W 4/02* (2013.01)

(58) Field of Classification Search
CPC ..... H04W 4/008; H04W 8/005; H04W 92/18; H04W 4/02; G08B 13/2462; G08B 13/2417

USPC ......................................... 455/41.3
See application file for complete search history.

(56) References Cited

U.S. PATENT DOCUMENTS

| | | | |
|---|---|---|---|
| 6,665,333 B2 | 12/2003 | McCrady et al. | |
| 7,340,260 B2 | 3/2008 | McAlexander | |
| 7,420,458 B1 | 9/2008 | Kuzma et al. | |
| 7,720,259 B2 | 5/2010 | Gordon et al. | |
| 9,402,160 B2 | 7/2016 | Lee et al. | |
| 2002/0118723 A1 | 8/2002 | McCrady et al. | |
| 2006/0071756 A1* | 4/2006 | Steeves ............. | G06K 7/10108 340/10.1 |
| 2007/0171047 A1 | 7/2007 | Goodman et al. | |
| 2008/0204322 A1* | 8/2008 | Oswald ................... | G01S 5/04 342/465 |
| 2009/0204265 A1* | 8/2009 | Hackett ............. | G05B 19/4185 700/284 |
| 2012/0087350 A1 | 4/2012 | Norair | |
| 2012/0224491 A1 | 9/2012 | Norair | |

(Continued)

*Primary Examiner* — Alejandro Rivero
*Assistant Examiner* — Angelica M Perez
(74) *Attorney, Agent, or Firm* — Holzer Patel Drennan

(57) ABSTRACT

An asset tracking system that utilizes a wireless network system and has primary (main) and secondary (sub) tracking devices or 'tags' that are assigned to assets. The main tracking device acts as a coordinator and the sub tracking devices surrounding the coordinator act as end-devices. Each main device acts as a gateway network to long range communication while each sub device can only communicate in proximity profile (short range or nearby communication). Each sub device can communicate only with a main device. The main device passes data from the sub device to a remote host transparently. Each sub device sends its data when it triggered by a 'ping' from the main device.

8 Claims, 12 Drawing Sheets

(56) References Cited

U.S. PATENT DOCUMENTS

| | | |
|---|---|---|
| 2012/0224530 A1 | 9/2012 | Norair |
| 2012/0225687 A1 | 9/2012 | Norair |
| 2012/0306438 A1* | 12/2012 | Howard ................ A42B 3/046 320/107 |
| 2013/0321211 A1 | 12/2013 | Chakraborty et al. |
| 2013/0324151 A1 | 12/2013 | Lee et al. |
| 2013/0324152 A1 | 12/2013 | Lee et al. |
| 2014/0052832 A1* | 2/2014 | Dina .................... B23K 9/1087 709/221 |
| 2014/0085055 A1 | 3/2014 | Lee et al. |
| 2015/0296332 A1* | 10/2015 | Lee .................... G06K 19/0723 340/8.1 |

\* cited by examiner

WIRELESS ASSET TRACKING SYSTEMS WITH HETEROGENEOUS COMMUNICATION

CROSS REFERENCE

This application claims priority under 35 U.S.C. 119(e) to U.S. provisional application 62/154,236 filed Apr. 29, 2015, the entire disclosure of which is incorporated herein for all purposes.

FIELD OF THE DISCLOSURE

The present disclosure is directed to wireless asset tracking devices and systems. More particularly, the present disclosure is directed to features configured to provide communication between a primary asset tracking device (main tag) and secondary asset tracking device (sub tag).

BACKGROUND

In today's industry, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries.

Recently, technologies have been developed that greatly assist in tracking locations of assets. For example, global positioning systems (GPS) use wireless signals transmitted by earth-orbiting satellites to calculate the position of a receiving device. Although relatively expensive, GPS receivers are capable of providing relatively accurate location information for virtually any point in the world.

More recently, radio frequency identification (RF or RFID) systems have been developed in which tracking or transmitting devices, often referred to as "tags," wirelessly communicate with readers. RF tracking systems are typically used in parcel tracking and sorting, container tracking, luggage tracking, retail tracking, warehouse tracking and inventory operations. The tracking devices may be either passive or active. Passive devices absorb signals transmitted by the reader and retransmit their own signals, such as identification information. While a passive device does not require a local power source, its resulting transmit range is relatively short, typically less than 1-2 meters. In contrast, an active device, which sends a signal to indicate its location, includes a local energy source (such as a battery) that improves transmission range. Depending on the wireless signal system used by the device, the range may be on the order of several meters or several hundred meters, or even miles. Regardless of the types of device used, knowledge of the location of the device allows users to identify the location of an asset that has the tracking device attached thereto.

Although a tracking system is highly useful, there is a large initial start-up cost associated with these tracking systems; the larger the system, the more tracking devices are needed. In order to decrease the overall cost of the system, utilizing primary tracking devices (main tags) and secondary tracking devices (sub tags) to provide the same level of asset tracking and protection but decrease overall system cost has been proposed (e.g., U.S. patent application publication 2015/0296332 entitled "Asset Tracking System Having Primary and Secondary Tracking Devices"). In this publication, some assets being tracked are furnished with primary tracking devices and others with secondary tracking devices, which cost less and have less features than the primary tracking device. With a high aspect ratio deployment between the primary and secondary devices to lower the system cost, a 100% deployment rate can be achieved.

In some systems such as of the publication discussed above, the primary tracking device (main tag) acts as a coordinator and the secondary devices (sub tags) surrounding the coordinator act as end-devices. Each secondary device can communicate only with the primary device in proximity. Even with this, the number of sub tags surrounding a main tag at a point of time can be variable and unknown. If the number of sub tags is too high, it may cause communication collisions. An absence of a main tag can lead to a power drain of the sub tag, since the sub tag will continue to attempt to establish a communication with a main tag, even if one cannot be found.

There is a need for heterogeneous communication between the main tag and sub tags to overcome the problems described above, and other problems, as will become apparent to one skilled in the art.

SUMMARY

The present disclosure provides an asset tracking system that utilizes a wireless network system that includes primary (main) and secondary (sub) tracking devices or 'tags'. In this combined asset tracking system, some assets being tracked are furnished with a primary tracking device (main tag), and others with a secondary tracking device (sub tag). The main tag acts as a coordinator and the sub tags surrounding the coordinator act as end-devices. Each main tag acts as gateway network to long range communication while each sub tag can only communicate in proximity profile (nearby communication). Each secondary device can communicate only with a primary device. The primary device passes messages (data) from the secondary device to the remote host transparently. Each secondary device only sends its data when it triggered by a 'ping' from the primary device.

This disclosure provides, in one particular embodiment, a wireless RF tracking system that includes a receiver, a main tag or primary device and at least one sub tag or secondary device. The main tag has a short range communication module (e.g., ZigBee/BLE) and a long range communication module (e.g., cellular, WiFi, LP_WAN, satellite) for communication with the receiver and with the at least one sub tag. The at least one sub tag has only short range communication module (e.g., ZigBee/BLE) for communication with the main tag but not with the receiver. It is typically well accepted that "short range" is less than about 10 m, whereas "long range" is more than about 100 m; in some implementations, "short range" may cover up to about 100 m, but the signal strength is weak.

This disclosure provides, in another particular embodiment, heterogeneous communications between the main tag and sub tag(s); four exemplary communication scenarios are outlined. In one or more scenarios, a real time clock is available, with which a timing clock of either a main tag or a sub tag is synchronized. In one or more scenarios, one-way or two-way communication between the main tag and sub tag(s) is established.

In scenario 1, the main tag is only in a 'receive' mode, while the sub tag(s) is only in a 'transmit' mode. There is no real time clock available with which a timing clock of either the main tag or sub tag is synchronized. In order to manage power consumption, both the main tag and sub tag(s) wake up randomly for a period of time at defined intervals to establish a communication between them.

In scenario 2, the main tag is in both 'receive' and 'transmit' modes, and the sub tag(s) is also in both 'receive' and 'transmit' modes. In order to manage power consumption, both the main tag and sub tag(s) wake up randomly for a period of time at defined intervals to establish a communication between them. Once the main tag has received a data packet from the sub tag, the main tag sends an acknowledgment to the sub tag, and the sub tag goes to sleep for an extended period of time.

In scenario 3, the main tag is only in a 'receive' mode, while the sub tag(s) is only in a 'transmit' mode. However, a real time clock is available with which a timing clock of either main tag or sub tag(s) is synchronized. In order to manage power consumption, both the main tag and sub tag(s) wake up randomly for a period of time at defined intervals to establish a communication between them. This time period is much shorter than in scenario 1.

In scenario 4, the main tag is in both 'receive' and 'transmit' modes, and the sub tag(s) is also in both 'receive' and 'transmit' modes. In order to manage power consumption, both the main tag and sub tag(s) wake up randomly for a period of time at defined intervals to establish a communication between them. This time period is much shorter than in scenario 3. Once the main tag receives a data packet from the sub tag, the main tag sends an acknowledgment to the sub tag, and the sub tag goes to sleep for an extended period of time.

This disclosure also provides two schemes in which power transmit power level of the sub tag is managed, particularly, with random power ramp-up (RPR), and progressive power ramp-up (PPR). In RPR, a power level with which the sub tag transmits its data packet is random. In PPR, the sub tag transmits its data packet with incremental or incremented power levels.

A self-test scenario of this heterogeneous communication is also proposed in this system. A main tag wakes up for a short period of time on a 'receive' mode, while a sub tag wakes up for a much shorter period of time on a 'transmit' mode. The sub tag randomly sends its pings, and the main tag expects to receive one of those pings within a predetermined time.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

Although wireless tracking systems are highly useful, there is a large initial start-up cost associated with these tracking systems; the larger the system, the more tracking devices are needed. The present disclosure is directed to a wireless, active, RF tracking system that, to decrease the overall cost of the system, utilizes primary tracking devices and secondary tracking devices to provide the same level of asset tracking and protection but decrease overall system cost.

Figure 1:
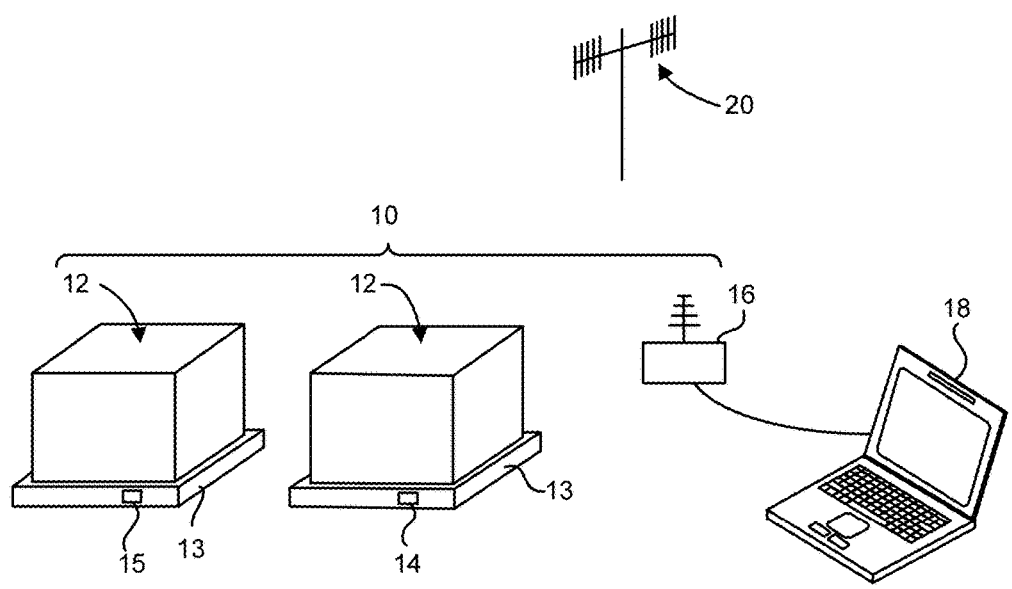
FIG. 1 is a schematic diagram of a wireless asset-tracking system including a tracking device and a receiver.

FIG. 1 illustrates a tracking system according to this disclosure. A "tracking system" and variations thereof includes at least one tracking or transmitter device, and a receiver for receiving the location signal from the tracking transmitter device(s). A "tracking device," "transmitter device," "tag," and variations thereof is a portable, signal emitting device configured for placement in or on an asset to be tracked, such as a container of goods, the device including non-volatile memory. A tracking system 10 of FIG. 1 has a primary tracking device (main tag) 14 associated with (e.g., located on) an asset 12, in particular, on a pallet 13. Tracking device 14 is an active RF tag, having the capability to actively transmit and/or provide interactive information to a receiver 16, located remote from asset 12 and transmitter device 14. Tracking system 10 also has a secondary tracking device (sub tag) 15 associated with (e.g., located on) an asset 12', in particular, on a pallet 13'. Tracking device 15 is an active RF tag, having the capability to actively transmit and/or provide interactive information to primary tracking device 14.

Receiver 16 is operably connected to a computer, server, or display 18. System 10 uses an established wireless communication network 20 for communication between receiver 16 and primary tracking device (main tag) 14, and between primary tracking device (main tag) 14 and secondary tracking device (sub tag) 15. Examples of wireless RF communication networks 20 with which system 10 can function include ZigBee, Bluetooth Low Energy (BLE), WiFi (sometimes referred to as WLAN), LTE, and WiMax. In some embodiments, a CDMA/GMS communication network, which can be considered to be a cellular frequency, may be additionally or alternately used. In another embodiment, a low power WAN (LP_WAN) network or satellite may be additionally or alternately used.

System 10 includes at least one primary tag or tracking device 14 and in most embodiments includes at least 2 primary tags or tracking devices 14. System 10 also includes at least one secondary tag or tracking device 15 and in most embodiments includes at least 2 secondary tags or tracking devices 15. In some embodiments, the ratio of secondary tracking devices to primary devices in the system is 1:1; however, in most embodiments it is greater than 1:1, for example, 5:1, 10:1, 20:1, up to 50:1.

Primary tracking device (main tag) 14 has a power source, in this particular embodiment a battery. The battery should last for about one year and preferably longer. In order to achieve the desired battery life, one should manage the power consumption of the tag.

During a 'receive' mode, the primary tracking device draws, e.g., 30 mA current, while during a 'transmit' mode, the primary tracking device draws more, e.g., 180 mA current. Assume the primary tracking device is turned on ('receive' mode) for five minutes every day, the primary tracking device will consume 1 Ah energy in one year. Assume the primary tracking device, in the 'transmit' mode, sends a ping every 30 seconds, the primary tracking will consume 1000 mAh energy for one year.

Each tracking device (main tag) 14 has appropriate circuitry and programming (e.g., in a CPU) to implement various power management techniques within device 14. For example, device 14 can be configured to have its data collection or ping event be event-based, time-based, or based on any other protocol. Tracking device 14 also includes a positioning element, such as a WiFi, or GPS and/or GLONASS positioning element. The positioning element may also include mobile station-assisted (MSA) operation to enable accurate positioning at locations where GPS/GLONASS is unavailable or impaired. The positioning element provides data to tracking device 14 regarding its physical location.

Primary tracking device (main tag) 14 transmits information or data, such as its location, in the form of a "ping" to the remote receiver (e.g., receiver 16 of FIG. 1) via a wireless network, such as ZigBee and/or WiFi and/or low power long range WAN (LP_WAN). In some embodiments, tracking device 14 has two-way communication with the receiver. That is, tracking device 14 transmits information (i.e., a ping) and also receives information from the receiver. Further, tracking device 14 may receive instructions, such as to acknowledge that device 14 is active and ready and to transmit the location information. Having received those instructions, device 14 can send back to the receiver acknowledgement that the communication was received and acted on.

Primary tracking device (main tag) 14 includes a wireless RF module, cellular module, satellite module, or any combination of these communication modules, to provide a communication basis for tracking device 14 to and from the receiver. A wireless RF module, which connects device 14 to a wireless RF network, can be utilized when infrastructure is available to use of RF communications, and a cellular module, which connects device 14 to a cellular network, can be utilized, for example, in situations when infrastructure is unavailable for using RF communications yet do allow cellular communications. A cellular communication module can be CDMA (Code Divisional Multiple Access) and/or GSM (Global System for Mobile Communication) and/or LTE (Long Term Evolution) module, configured to connect to the receiver via either a CDMA or GSM or LTE network and communicate data to the receiver. In some embodiments, however, tracking device 14 includes a satellite module, to provide another communication means to device 14, as an alternate or back-up to the RF and/or cellular modules.

Primary tracking device (main tag) 14 includes a motion sensor and in some embodiments, a vision sensor to determine the orientation, location and/or movement of device 14. The motion sensor may be a single sensor or an array of sensors. An example of a suitable motion sensor is a 10-degree of freedom (DOF) device that includes a 3-axis gyroscope, 3-axis accelerometer, 3-axis magnetometer, and an altitude sensor. By sensing the various multiple degrees of freedom, device 14 can distinguish among various movements, orientations and locations, such as lateral motion, acceleration, inclined or declined motion, and altitude.

As indicated above, the primary tracking device (main tag) 14 can be configured to have its data collection or ping event be event-based (e.g., a business event) or time-based, or based on any other protocol. Examples of various event-based protocols, identified as SMART Ping™ events, such as described in U.S. Patent Application Publication 2013/0321211 titled "Asset Tracking System with Adjusted Ping Rate and Ping Period," U.S. Pat. No. 9,020,527 titled "Asset Tracking System with Data Ping Based on Asset Movement," U.S. Pat. No. 9,253,752 titled "Asset Tracking System Activated by Predetermined Pattern of Asset Movement," and U.S. Patent Application Publication 2014/0085055 titled "Pattern Recognition Based Motion Detection for Asset Tracking System," all which are incorporated herein by reference in their entirety, can further be used to optimize power consumption. Another method, which stores multiple data points and sends it once, described in U.S. Patent Application Publication 2014/0187261 titled "Methodology to Extend Battery Power in Asset-Tracking Device" and also incorporated herein by reference in its entirety, can additionally or alternately be used.

Due to high degree of technicality in the primary tracking device (main tag) 14, for some applications, 100% deployment rate of this asset-tracking device is cost prohibitive. The system of this disclosure (e.g., system 10 of FIG. 1), provides a lower cost system than conventional asset-tracking systems by utilizing two transmitter devices, a primary device such as tracking device 14 described above, and secondary tracking device 15, or sub tag. Secondary tracking device 15 is similar to primary tracking device 14 in that device 15 includes a battery, appropriate circuitry and programming, a positioning element, motion sensor, and transmitter and receiver, appropriate as described below.

Secondary tracking device (sub tag) 15 is configured with a short range wireless RF communication module such as ZigBee and/or BLE to connect to primary tracking device 14 via a ZigBee and/or a BLE network. An alternate embodiment can utilize only a ZigBee module or only a BLE (Bluetooth) module to connect to primary tracking device 14 via and a corresponding network. The short range RF module provides the communication basis for secondary tracking device 15 to and from primary tracking device 14. To simplify the secondary tracking device 15 in relation to the primary tracking device 14, and thus typically decrease its cost, secondary device 15 does not include a long range wireless RF module such as WiFi, Wimax, low power long range WAN or cellular module, nor a satellite module.

In some embodiments, the secondary tracking device 15 has two-way communication capability with the primary device 14. That is, secondary device 15 transmits information and also receives information from primary device 14. Secondary device 15 transmits information, such as location, through primary device 14. Further, secondary device 15 could receive instructions, such as to acknowledge that device 15 is active and ready to transmit the location information. Having received those instructions, secondary device 15 can send back to primary device 14 an acknowledgement that the communication was received and acted on.

The asset tracking system of this disclosure adopts a star network topology. In this network topology, primary device 14 acts as a coordinator, and at least one secondary device 15 surrounding the coordinator acts as an end-device. One primary device 14 may have 1, 2, 5, 10, 15, and even up to 50 or more secondary devices 15 associated with it. In some embodiments, 50 secondary devices can be associated with a single primary device. Each secondary device 15 can communicate only with primary device 14, and not with remote host or receiver 16. Primary device 14 passes messages (data) from secondary device 15 to the remote receiver 16 transparently.

A number of secondary devices (sub tags) surrounding a primary device (main tag) at a point of time may be variable and unknown. If the number of the sub tags is too high, it may cause communication collisions. Additionally, absence of a main tag can lead to a power drain of the sub tag, since the sub tag will attempt to establish a communication with the main tag.

To inhibit these undesired occurrences of collisions and power drain, system 10 provides heterogeneous communications between primary device (main tag) 14 and secondary devices (sib tag) 15; four communication scenarios are shown in Table 1.

TABLE 1

|  | One-way | Two-way |
| --- | --- | --- |
| RTC: No | Scenario 1 | Scenario 2 |
| RTC: Yes | Scenario 3 | Scenario 4 |

The four scenarios, above, are based on ZigBee protocol (802.15.4), though it can be generalized to other protocols, including Bluetooth. In one or more scenarios, a real time clock (RTC) is available with which a timing clock of either the main tag or sub tag is synchronized. Here, both main and sub tags are awake at a predetermined time. If an RTC is not available, either the main tag or sub tag search randomly for each other. In one or more scenarios, a one-way or two-way communication between the main tag and sub tag are established. In one-way communication, a sub tag sends its data package to the main tag without knowing that its data package is received by a main tag. In two-way communication, the main tag sends an acknowledgment (ACK) command to the sub tag acknowledging that a data package from the sub tag has been received.

In scenario 1, the main tag is only in a 'receive' mode, while the sub tag is only in a 'transmit' mode. There is no real time clock available in which a timing clock of either the main tag or sub tag is synchronized. In order to manage power consumption, both the main tag and sub tag wake up randomly for a period of time at defined intervals to establish a communication between them. In this scenario, there is only one-way communication (data is sent from the sub tag to the main tag without an acknowledgement) and no real time clock.

In scenario 2, the main tag is in both 'receive' and 'transmit' modes, and the sub tag is also in both 'receive' and 'transmit' modes. In order to manage power consumption, both the main tag and sub tag wake up randomly for a period of time at defined intervals to establish a communication between them. Once the main tag has received a data packet from the sub tag, the main tag sends an acknowledgment to the sub tag, and the sub tag goes to sleep for an extended period of time. In this scenario, there is two-way communication (data is sent from the sub tag to the main tag and the main tag sends an acknowledgement) and no real time clock.

In scenario 3, the main tag is only in a 'receive' mode, while the sub tag is only in a 'transmit' mode. However, a real time clock is available with which a timing clock of either main tag or sub tag is synchronized. In order to manage power consumption, both the main tag and sub tag wake up randomly for a period of time at defined intervals to establish a communication between them. This time period is much shorter than in scenario 1. In this scenario, there is only one-way communication (data is sent from the sub tag to the main tag without an acknowledgement) and there is a real time clock.

In scenario 4, the main tag is in both 'receive' and 'transmit' modes, and the sub tag is also in both 'receive' and 'transmit' modes. In order to manage power consumption, both the main tag and sub tag wake up randomly for a period of time at defined intervals to establish a communication between them. This time period is much shorter than in scenario 3. Once the main tag receives a data packet from the sub tag, the main tag sends an acknowledgment to the sub tag, and the sub tag goes to sleep for an extended period of time. In this scenario, there is two-way communication (data is sent from the sub tag to the main tag and the main tag sends an acknowledgement) and there is a real time clock.

Table 2 illustrates exemplary differentiation features of the four communication scenarios between a primary device (main tag) and a secondary device (sub tag).

TABLE 2

|  | Scenario 1 | Scenario 2 | Scenario 3 | Scenario 4 |
| --- | --- | --- | --- | --- |
| Battery Consumption | Moderate | Low to moderate | Low | Low |
| Update period | 24 hrs | 24 hrs | 1 hr | 1 hr |
| Collision rate | Low | Low | Very low to low (for large N) | Very low |
| Complexity | Low | Moderate | Low | Moderate |
| Scaling | Limited | Suitable | Limited | Suitable |
| ETC |  |  | RTC requires additional battery and complexity (though little) | RTC requires additional battery and complexity (though little) |

In the example of Table 2, an update period for both scenario 1 and scenario 2 is 24 hours, while an update period for scenario 3 and scenario 4 is one hour. Even though the update period of both scenarios 3 and 4 is every hour, the power consumption of both scenarios is low. Both scenarios 2 and 4 are characterized by scaling possibility. Scenario 1 is characterized by low complexity and collision rate. Scenario 2 is characterized by low collision rate, and suitable for scaling. Scenario 3 is characterized by low complexity and collision rate. Scenario 4 is characterized by low power consumption and collision rate.

Figure 2:
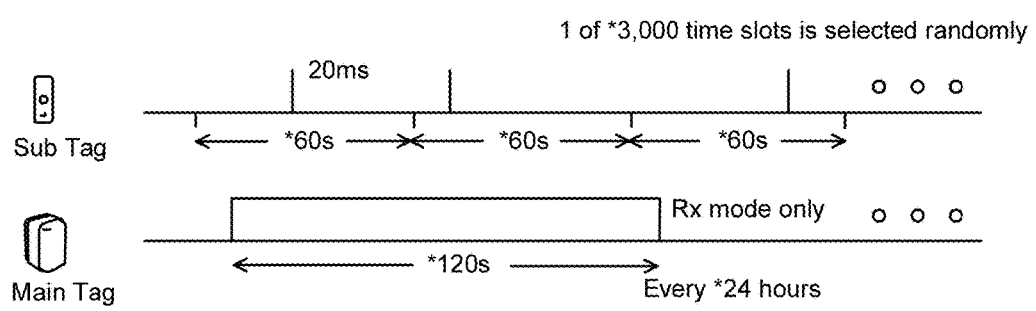
FIG. 2 is an example timing diagram for a communication scenario 1.

FIG. 2 shows the embodiment of scenario 1 from Table 2 where there is no real time clock (RTC), only one-way communication (no acknowledgement), and the main tag is only in a 'receive' mode, while the sub tag is only in a 'transmit' mode. Both the main tag and sub tag wake up randomly for a period of time at defined intervals to establish a communication between them.

For example, the sub tag sends a ping every minute (60 seconds), and the main tag will wake for 120 seconds every day. If the duration of the ping is 20 ms, there are 3000 timeslots available. One timeslot within one minute is selected randomly for the ping. Therefore, an interval between pings is also random as well. If the sub tag sends one ping for every minute, and every ping will consume, e.g., 180 mA, then the sub tag will need 530 mAh energy for about a year. If the main tag is awake for 120 seconds in receive mode for every day, and every receive mode will consume, e.g., 30 mA, then the main tag will need 400 mAh energy for about a year to establish a communication with sub tags. Assuming there are "n" number of sub tags in close proximity with the main tag, the collision rate is (n−1)/3000.

Figure 3:
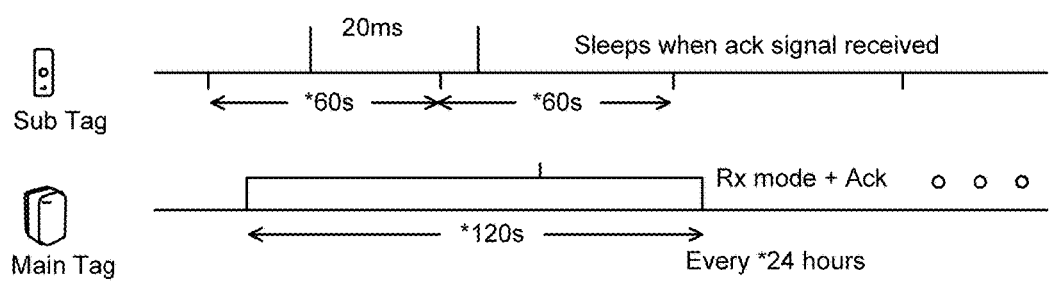
FIG. 3 is an example timing diagram for a communication scenario 2.

FIG. 3 shows the embodiment of scenario 2, where there is no RTC, two-way communication, and both the main tag and sub tag are in both 'receive' and 'transmit' modes. Once the main tag receives a data packet from the sub tag, the main tag sends an acknowledgment (ACK) to the sub tag, and the sub tag goes to sleep for an extended period of time. In order to manage power consumption, both the main tag and the sub tag wake up randomly for a period of time at defined intervals to establish a communication between them.

For example, the sub tag sends a ping for 20 ms duration every minute, and goes to a 'receive' mode waiting for ACK from the main tag for 10 seconds or up to 60 seconds, depending on when the 20 ms ping occurred within 60 second status update time slot. Since a duration of the ping is 20 ms, there are 3000 timeslots available within its status update of one minute. One timeslot is selected randomly. Therefore, an interval between pings is also random as well. If the sub tag sends one ping every minute, and every ping consumes, e.g., 180 mA, then the sub tag will need 530 mAh energy for about a year. If the sub tag goes to 'receive' mode for 10 seconds, and every receive mode consumes, e.g., 30 mA, then the sub tag will need 400 mAh energy for about one year. So in total, the sub tag will consume 1030 mAh energy. However, since the sub tag goes to 'sleep' mode for an extended period of time after it receives an ACK, the required energy will be much less than 1030 mAh.

In the same example, the main tag will wake for 120 seconds every day. Within this 120 second 'receive' mode, if the main tag receives a ping from the sub tag, the main tag goes to 'transmit' mode, and sends an ACK. After that it goes to 'receive' mode again for the remainder of its 120 second time slot. If the main tag awakes for 120 seconds in 'receive' mode for every day, and every 'receive' mode consumes, e.g., 30 mA, then the main tag will need 400 mAh energy for about a year to establish communication with sub tags. Assuming there are "n" number of sub tags in close proximity with the main tag, a collision rate is (n−1)/3000.

Figure 4:
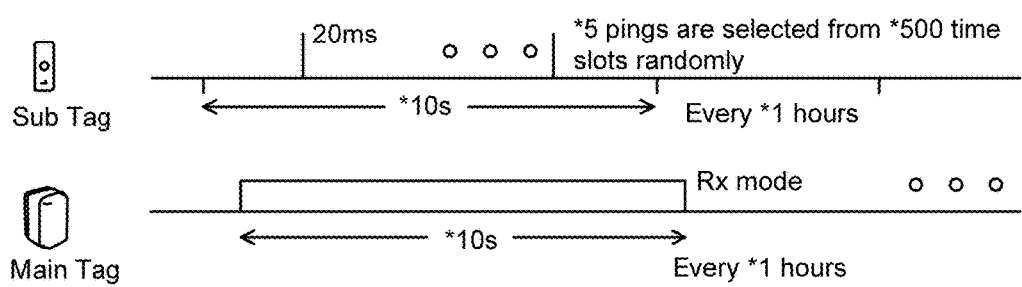
FIG. 4 is an example timing diagram for a communication scenario 3.

FIG. 4 shows the embodiment of scenario 3, where there is an RTC, the main tag is only in a 'receive' mode, the sub tag is only in a 'transmit' mode, and there is only one-way communication. Both the main tag and sub tag wake up every hour for 10 seconds to establish a communication between them.

For example, the sub tag sends five pings within a 10 second time slot and the main tag wakes up in 'receive' mode for 10 seconds as well. Since a duration of the ping is 20 ms, there are 500 timeslots available within the ten second time slot. Five pings are selected randomly from available 500 timeslots. The interval between pings is also random as well. If the sub tag sends 5 pings for every hour, and every ping consumes, e.g., 180 mA, then the sub tag will need 50 mAh energy for about a year. If the main tag awakes for 10 seconds in 'receive' mode every hour, and every 'receive' mode consumes, e.g., 30 mA, then the main tag will need 800 mAh energy for about a year to establish a communication with the sub tags. Assuming there are "n" number of sub tags in close proximity with the main tag, a collision rate is $(n-1)^5/100$.

Figure 5:
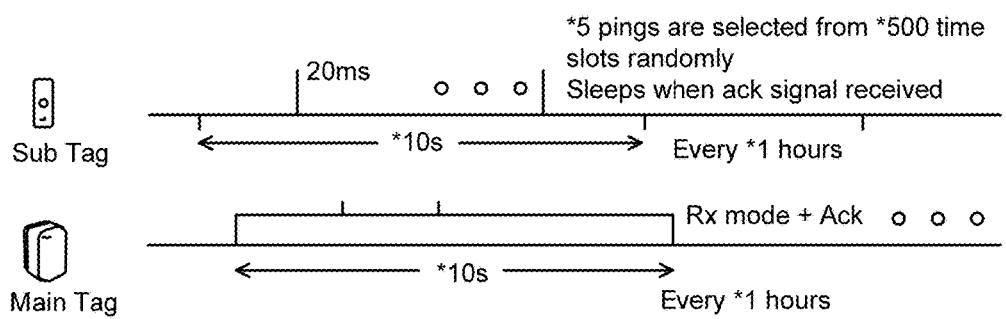
FIG. 5 is an example timing diagram for a communication scenario 4.

FIG. 5 shows the embodiment of scenario 4, where there is an RTC, both the main tag and sub tags are in both 'receive' and 'transmit' modes, and there is two-way communication. Once the main tag receives a data packet from the sub tag, the main tag sends an ACK to the sub tag, and the sub tag goes to sleep for an extended period of time. Both the main tag and sub tag wake up every hour for 10 seconds to establish a communication between them.

For example, the sub tag sends five pings within a 10 second time slot and the main tag wakes up in 'receive' mode for 10 seconds as well. After it sends its ping, the sub tag goes to a 'receive' mode waiting for an ACK from the main tag for 1 second or until a second ping is sent by the sub tag. Since a duration of the ping is 20 ms, there are 500 timeslots available within a ten seconds time slot. Five pings are selected randomly from available 500 timeslots. Therefore, an interval between pings is also random as well. If the sub tag sends 5 pings for every hour, and every ping consumes, e.g., 180 mA, then the sub tag will consume less than 50 mAh energy for about a year since it goes to sleep for extended time after it receives the ACK.

During the 'receive' mode of 10 seconds, if the main tag receives a ping from the sub tag, the main tag goes to 'transmit' mode, and sends an ACK. After that it goes to 'receive' mode again for remainder of its 10 second time slot. If the main tag awakes for 10 seconds in 'receive' mode every hour, and every 'receive' mode consumes, e.g., 30 mA, then the main tag will need 800 mAh energy for about a year to establish a communication with sub tags. Assuming there are "n" number of sub tags in close proximity with the main tag, a collision rate is $(n-1)^5/100$.

In a ZigBee network, there are sixteen available channels in the frequency band. In one embodiment, the above four scenarios use a time division multiple access (TDMA) with random communication. However, in another embodiment, TDMA with scheduled communication is used. In another embodiment, a frequency division multiple access (FDMA), either with random communication or scheduled communication, is used. Both the main tag and the sub tag can switch channels either in random or scheduled communications.

Figure 6:
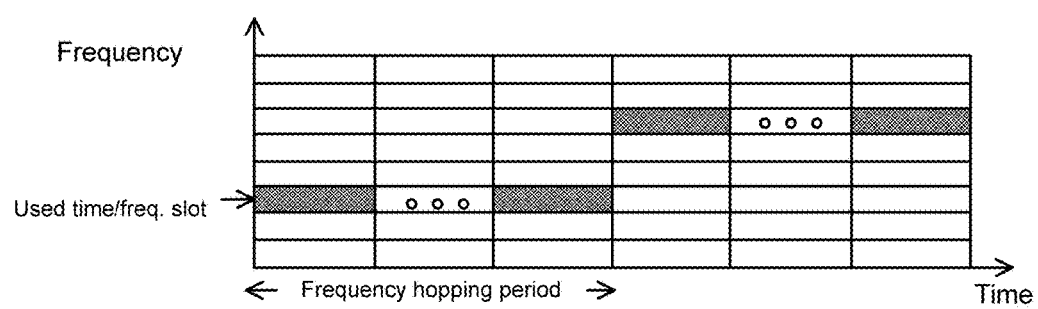
FIG. 6 is a frequency hopping timing diagram.

FDMA offers a benefit in term of collision rate, particularly in a situation where multiple main tags are present in proximity to each other. In FDMA, a frequency hopping period could be made variable. FIG. 6 illustrates an example of a frequency hopping implementation in FDMA. It is understood that for fewer main tag and sub tags, using multiple channels can lead to an update delay, and an increase of power consumption. In order to combat this issue, channels can be assigned by the system depending on the number of main tags present on a site.

The power level by which the tag sends its ping can be changed accordingly. In this system, the power level of the sub tag is variable, while the power level of the main tag is constant. For example, the power level of the sub tag can be random power ramp-up (RPR), or progressive power ramp-up (PPR).

Figure 7A:
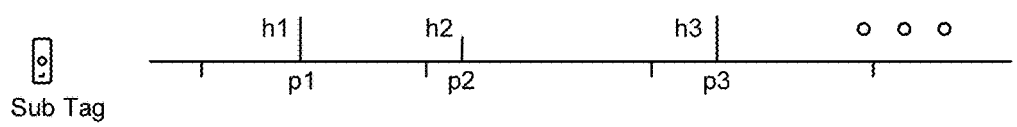
FIG. 7A is an example schematic diagram of random power ramp-up (RPR)

In random power ramp-up (RPR), the power level of the sub tag within its status time slot is random. FIG. 7A illustrates an example of RPR. Here, the sub tag sends its pings with different power levels; for example, first ping p1 has a power level of h1, second ping p2 has a power level h2, and third ping p3 has a power level h3. Shown in FIG. 7A, h1 is higher than h2, and h2 is lower than h3; of course, h1, h2 and h3 could have other relative levels.

Figure 7B:
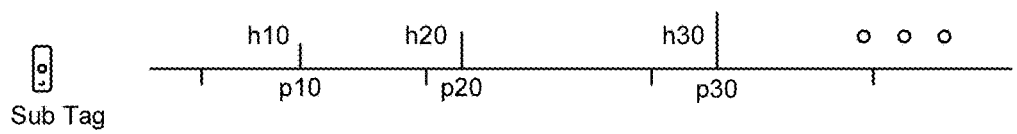
FIG. 7B is an example schematic diagram of progressive power ramp-up (PPR)

In progressive power ramp-up (PPR), the power level of the sub tag within its status time slot increases (e.g., linearly) over time until the sub tag receives acknowledgment from the main tag or its maximum level is reached. FIG. 7B illustrates an example of PPR. Here, the sub tag send its pings with different power levels; for example first ping p10 has a power level of h10, second ping p20 has a power level h20, and third ping p30 has a power level h30. As shown in FIG. 7B, the power level increases with each ping: h10 is lower than h20, and h20 is lower than h30.

Figure 8A:
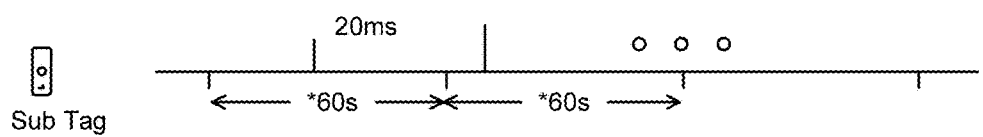
FIG. 8A is an example timing diagram for communication scenario 1 with RPR.
Figure 8B:
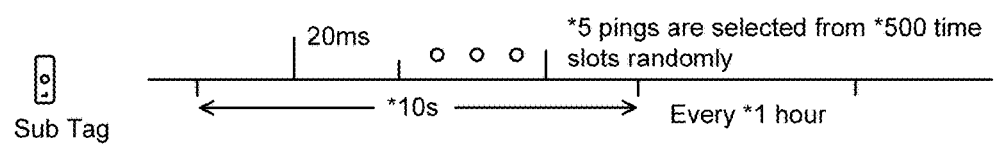
FIG. 8B is an example timing diagram for communication scenario 3 with RPR.

FIG. 8A illustrates an example of an RPR for scenario 1. Here, the sub tag sends a ping within every minute (60 seconds), and every time it sends its ping, the power level of its ping is randomly chosen. The interval between pings is also random. FIG. 8B shows an example of the RPR for scenario 3. Here, the sub tag sends five pings within a 10 second time slot. If a duration of the ping is 20 ms, there are 500 timeslots available within the 10 second time slot. Five pings are selected randomly from the available 500 timeslots. The interval between pings and the power level of each ping are random. In both scenarios 1 and 3 (where one-way communication is used and the ACK command is not present), the RPR reduces both power consumption and interference (collision rate).

Figure 9A:
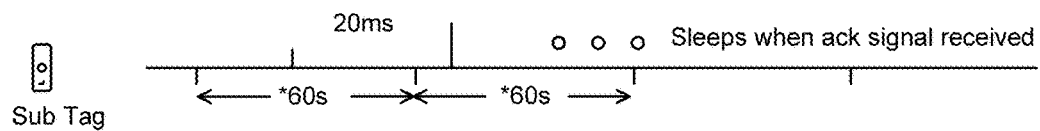
FIG. 9A is an example timing diagram for communication scenario 2 with PPR.
Figure 9B:
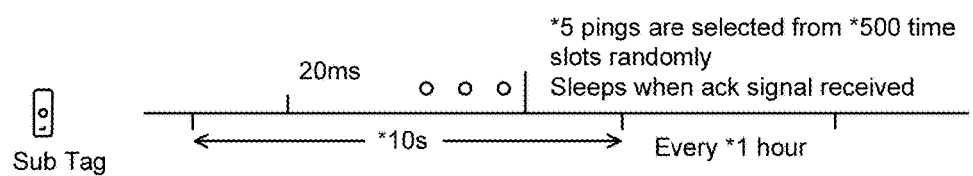
FIG. 9B is an example timing diagram for communication scenario 4 with PPR.

FIG. 9A illustrates an example of the PPR for scenario 2. Here, the sub tag sends a ping for 20 ms duration every minute, and goes to a 'receive' mode waiting for ACK from the main tag. As long as the ACK from the main tag is not received, every time the sub tag sends its ping, the power level of its ping increases progressively. The interval between pings is random. FIG. 9B shows an example of the PPR for scenario 4. Here, the sub tag sends five pings within a 10 seconds time slot and every time the sub tag sends its ping, the power level of the ping increases progressively. After it sends its ping, the sub tag goes to a 'receive' mode waiting for an ACK from the main tag. If a duration of the ping is 20 ms, there are 500 timeslots available within a 10 second time slot. Five pings are selected randomly from the available 500 timeslots. The interval between pings is also random as well. In both scenarios 2 and 4, (where two-way communication is used and ACK is present), the PPR can reduce both power consumption, and interference (collision rate).

Figure 9C:
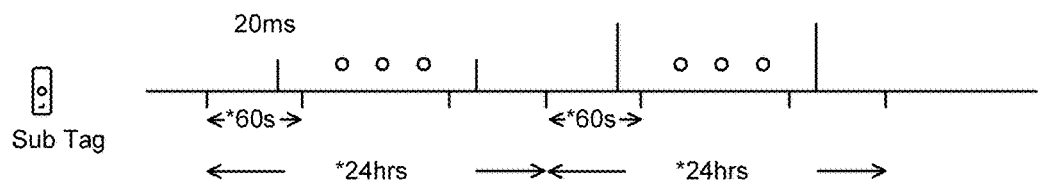
FIG. 9C is an example timing diagram for communication scenario 1 and scenario 2 with PPR.

In one or more embodiments, such as for scenario 1 and scenario 2 where no RTC is available within its status time slot of twenty-four hours, the power level of the sub tag is constant. However, in a subsequent status time slot, the power level of the sub tag is changed; in FIG. 9C the power level is shown increased, although in other embodiments the power level may decrease. In another embodiment, such as for scenario 3 and scenario 4 in which RTC is available, the sub tag may include its power level in the data package. Therefore, the main tag can send its ACK with the same power level as its sub tag.

Figure 10A:
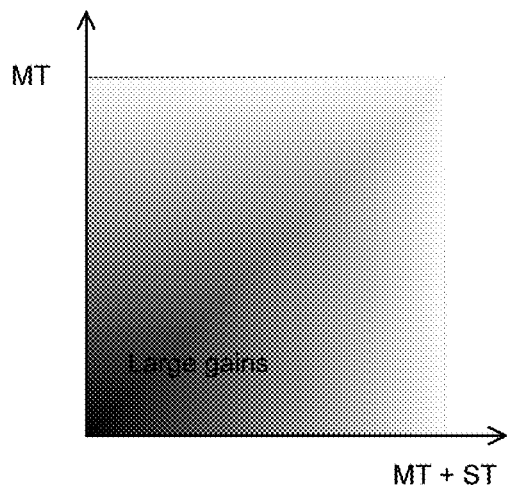
FIG. 10A is a graphical representation of benefits of a real time clock as a function of the number of main tags (MT) and sub tags (ST) in any given site.
Figure 10B:
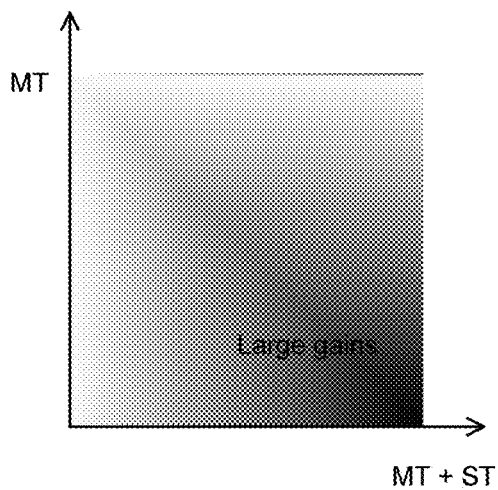
FIG. 10B is a graphical representation of benefits of an acknowledgment command as a function of the number of main tags (MT) and sub tags (ST) in any given site.

A performance of these heterogeneous communications of the main tag and sub tags is a balance and/or trade-off between power consumption (how long the battery lasts), and collision rate (how often data is updated). The performance of these heterogeneous communications depends highly on the number of main tags and sub tags present in the system. For example, the presence of the RTC is generally beneficial for both energy and collision aspects. However, when the number of both main tags and sub tags are very large, the benefit may not be significant, as illustrated in FIG. 10A, where it is seen that the largest gains are when the number of main tags (MT) and total tags (MT+ST) is lowest. FIG. 10B shows the affect of the ACK command. Advantages from ACK increase when the number of sub tags (ST) increases but decreases as the number of main tags (MT) increases since the ACK from multiple main tags to sub tags could collide.

Figure 10C:
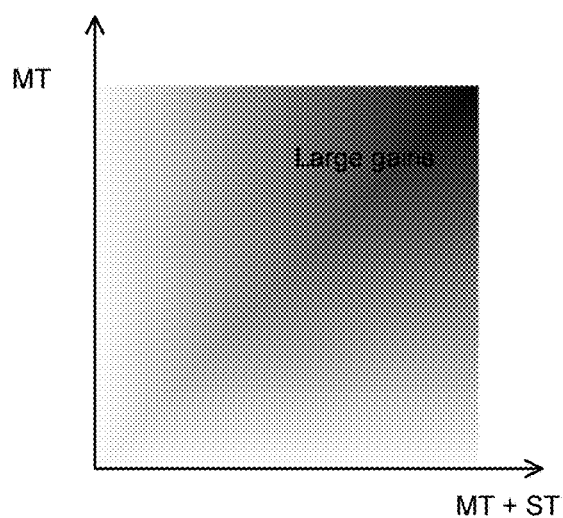
FIG. 10C is a graphical representation of benefits of multichannel as a function of the number of main tags (MT) and sub tags (ST) in any given site.

The use of multiple channels is beneficial for a system that has a large number of main tags and sub tags. However, the benefit decreases with decreasing numbers of main tags (MT) and sub tags (ST), as shown in FIG. 10C, where it is seen that the benefits of multiple channels is greatest at the highest numbers of tags. Therefore, for a small number of main tags and sub tags, a single channel is preferred.

Figure 11:
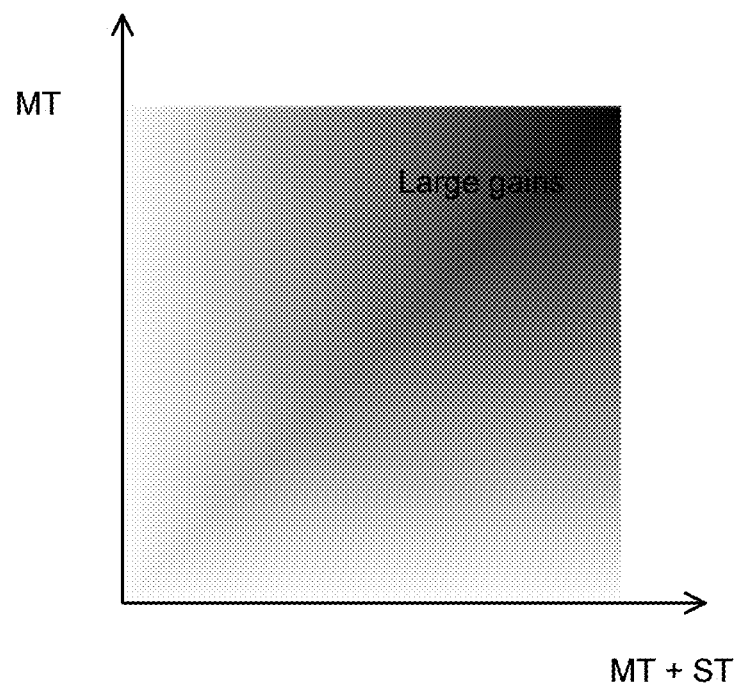
FIG. 11 is a graphical representation of benefits of power ramping as a function of the number of main tags (MT) and sub tags (ST) in any given site.

FIG. 11 illustrates power ramping up feature as a function of the number of main tags (MT) and sub tags (ST). The benefit of the power ramp-up is maximized when a large number of main tags and sub tags are involved in single system. It is also understood that a size of the site and density of tags will influence the performance of the system.

In any given site having a number of main tags and sub tags present in proximity, an effect of communication scenario between a main tag and sub tag(s) could be different. In addition, a best algorithm to achieve highest performance for a number of main tags and sub tags present in a given site could be varied as well.

Figure 12:
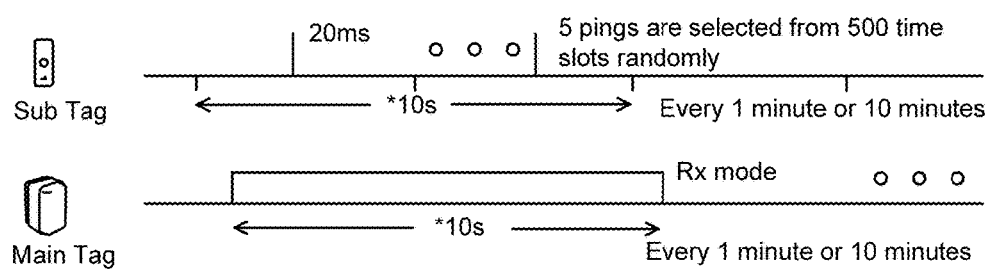
FIG. 12 is an example timing diagram of an example test scenario.

FIG. 12 illustrates a self-test protocol, for example, of scenario 3 (which has RTC and two-way communication). A status update of this self-test protocol is much shorter than a status update for of scenario 3 without the self-test protocol; for example, with the self-test protocol the status update can be, e.g., one or ten minutes, instead of one hour.

In the following example of a self-test, only one main tag and ten sub tags are used. In this proposed self-test, the sub tag sends five pings within a 10 second time slot, and the main tag wakes up in 'receive' mode for 10 seconds as well. Since a duration of the ping is 20 ms, there are 500 timeslots available within the ten second time slot. Five pings are selected randomly from the available 500 timeslots. Therefore, an interval between pings is also random as well. Since the duration of self-test is short, the battery life of the tags need not be considered. A collision rate of the self-test is about $1/10000$.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Also as used herein, when the phrase "at least one of" is used in conjunction with any of "and", "or", and "and/or" what is intended is that the phrase "at least one of X, Y or Z" encompasses, for example: one X; one Y; one Z; one X and one Y; two Xs; etc., unless the context specifically indicates otherwise.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A wireless RF tracking system comprising:
   a receiver;
   a primary active tracking device having a primary timing clock, a short range communication module and a long range communication module for communication with the receiver; and
   at least one secondary active tracking device having a secondary timing clock, a short range communication module for communication with the primary active tracking device but not with the receiver, the at least one secondary active tracking device being void of a long range communication module,
   the primary active tracking device comprising a 'receive' mode and a 'transmit' mode, the at least one secondary active tracking device comprising a 'receive' mode and a 'transmit' mode, and there being two-way communication between the at least one secondary active tracking device and the primary active tracking device,
   the primary active tracking device, in the 'transmit' mode, configured to send a ping signal having a first pulse width to the at least one secondary active tracking device; and
   the at least one secondary active tracking device, in the 'transmit' mode, configured to send a data package having a second pulse width less than the first pulse width to the primary active tracking device during the first pulse width.

2. The wireless RF tracking system of claim 1, the primary active tracking device comprising a ZigBee/BLE communication module and a cellular communication module.

3. The wireless RF tracking system of claim 2, wherein the cellular communication module is at least one of CDMA, GSM or LTE.

4. The wireless RF tracking system of claim 1, the at least one secondary active tracking device comprising a ZigBee/BLE communication module and no cellular communication module.

5. The wireless RF tracking system of claim 1, having a real time clock (RTC).

6. The wireless RF tracking system of claim 1, having no real-time clock (RTC).

7. The wireless RF tracking system of claim 1, wherein both the primary active tracking device and the at least one secondary active tracking device use a time division multiple access (TDMA).

8. The wireless RF tracking system of claim 1, wherein both the primary active tracking device and the at least one secondary active tracking device use a frequency division multiple access (FDMA).

* * * * *